United States Patent [19]

Woodmansee et al.

[11] Patent Number: 5,006,373
[45] Date of Patent: Apr. 9, 1991

[54] METHOD AND APPARATUS FOR COATING FIBERS WITH THERMOPLASTICS

[75] Inventors: Donald E. Woodmansee; Bang M. Kim, both of Schenectady, N.Y.

[73] Assignee: General Electric Company, Schenectady, N.Y.

[21] Appl. No.: 367,913

[22] Filed: Jun. 19, 1989

[51] Int. Cl.⁵ ............................................. B05D 1/02
[52] U.S. Cl. ............................... 427/422; 118/308; 427/398.1
[58] Field of Search ............... 427/195, 389–398, 427/422, 398–401; 118/308

[56] References Cited

U.S. PATENT DOCUMENTS

| 3,716,449 | 2/1973 | Gatward et al. | 162/101 |
| 4,614,678 | 9/1986 | Ganga | 156/244.12 X |
| 4,716,072 | 12/1987 | Kim | 428/212 |
| 4,743,413 | 5/1988 | Galichon | 427/412.3 X |

OTHER PUBLICATIONS

R. L. Stadterman et al., "Thermoplastic Composites-- Products and Applications", Tappi Journal, vol. 71, No. 9, 9/88, pp. 145–147.

*Primary Examiner*—Michael Lusignan
*Attorney, Agent, or Firm*—Patrick R. Scanlon; James C. Davis, Jr.; Paul R. Webb, II

[57] ABSTRACT

A process for forming a thermoplastic resin coating on glass fibers comprises heating a thermoplastic resin powder until molten and applying it to the glass fibers. The coated fibers can then be heated and drawn into a desired shape which also removes resin. Then the coated fibers are cooled to make a preform. The coated fiber preform can then be molded. Several resin layers with glass fibers of varying lengths can be deposited to make a graded preform. Apparatus for forming a thermoplastic resin on glass fibers sprays hot thermoplastic powder on the glass fibers. The coated fibers can then be heated such as by IR lamps and then drawn through a die which has a spigot to remove excess plastic. Alternately, a plurality of plastic and glass fiber layers can be deposited on a veil.

12 Claims, 2 Drawing Sheets

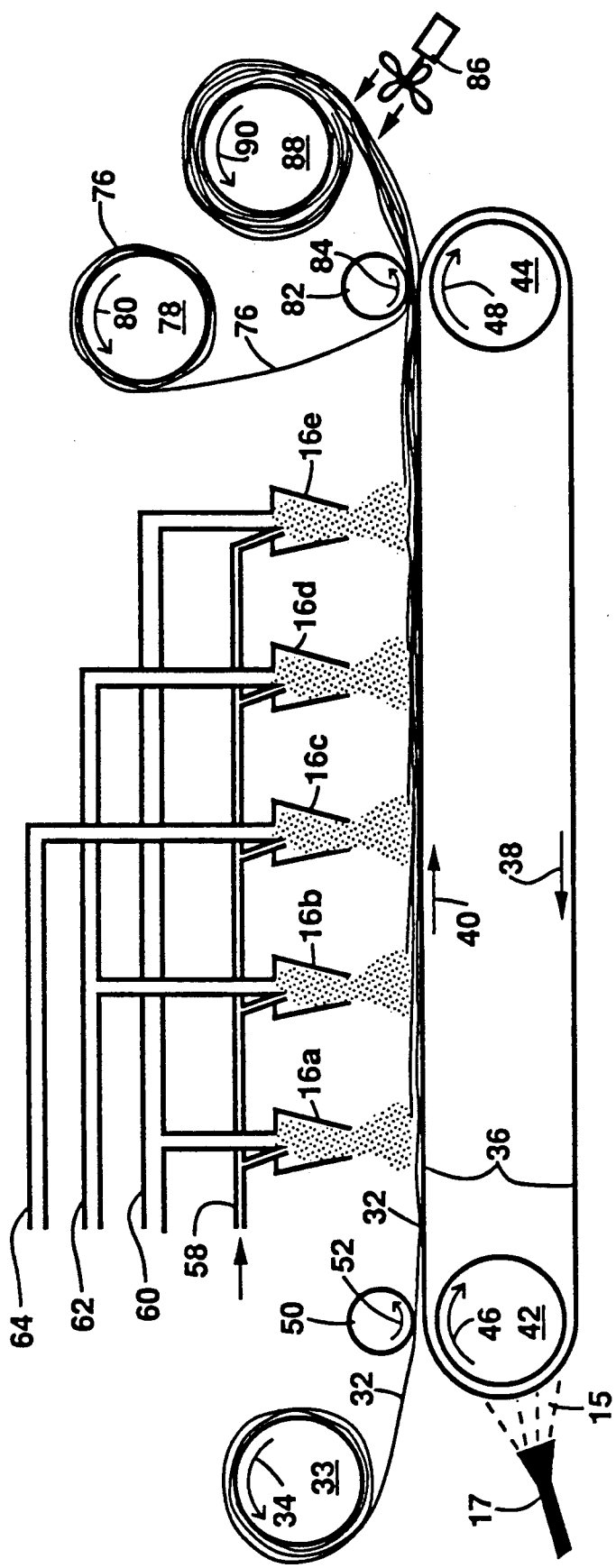
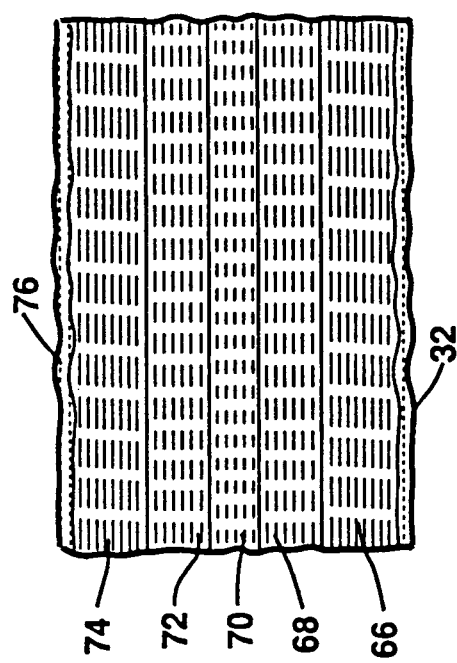

METHOD AND APPARATUS FOR COATING FIBERS WITH THERMOPLASTICS

BACKGROUND OF THE INVENTION

The present invention relates to coating fibers with a plastic, and more particularly, coating glass fibers with a thermoplastic.

Attempts to coat glass fibers with thermoplastic, either by impregnating glass mats with a melt of plastic or by drawing continuous fiber bundles through a melt, have met with difficulty in getting complete wetout in final formed composite parts. The problem is that the melt viscosity is much higher for most thermoplastics than it is for most thermosetting plastics with which these processes work well.

One process that addresses this problem is the Wiggins-Teape (W-T) process such as disclosed in U.S. Pat. No. 3,716,449. It comprises comminution of the thermoplastic and then contacting it with the glass fibers. Then the mixture of glass fibers and ground plastic is suspended in a foam created from a slurry. The water is then removed, the foam "broken", and the resulting structure is a fiber mat with the plastic particles loosely bound in the matrix. This process has the advantage of not needing to melt the plastic to create the mat preform structures. The disadvantages of this process include the complex slurry handling, contamination by foaming materials, and the movement and loss of particles from the mat on subsequent handling since they were never molten in the presence of the fibers. The W-T process also cannot use continuous fibers, and the structure of the mat is uniform through it thickness since the slurry containing plastic particles and chopped fibers is well mixed. Thus the W-T process cannot make a non-uniform mat or blanket of fibers and resin particles.

It is therefore an object of the present invention to have a process and apparatus for applying a thermoplastic to a fiber that has simplified handling without movement and loss of material or addition of forming materials, can be used with continuous fibers, and can make mats with non-uniform fiber lengths throughout their thickness.

SUMMARY OF THE INVENTION

A process in accordance with the invention for coating glass fibers with a thermoplastic comprises heating a thermoplastic powder; applying said heated plastic powder to the fibers; and cooling the coated fibers below the glass transition temperature of the thermoplastic.

An apparatus in accordance with the invention for coating glass fibers with a thermoplastic comprises means for heating a thermoplastic powder; and means for applying said heated thermoplastic powder to the fibers to coat the fibers.

The resulting plastic-coated tow or blanket is drapable because the plastic particles stick to the fibers as particles without flowing together or around the fibers, which would make the tow or blanket stiff and boardy. The low or blanket is then utilized in subsequent forming operations. The plastic-coated tows can be pultruded to make rods or bars. The plastic-coated blankets are then cut out to make preforms that are subsequently compression molded to final density.

BRIEF DESCRIPTION OF THE DRAWING

FIG. 2 is an elevation view of second embodiment of the invention used to make non-uniform mats; and FIG. 3 is a cross-sectional view of a preform mat made by the apparatus of FIG. 2.

In the drawings corresponding reference numerals are given to corresponding elements.

DETAILED DESCRIPTION

Figure 1:
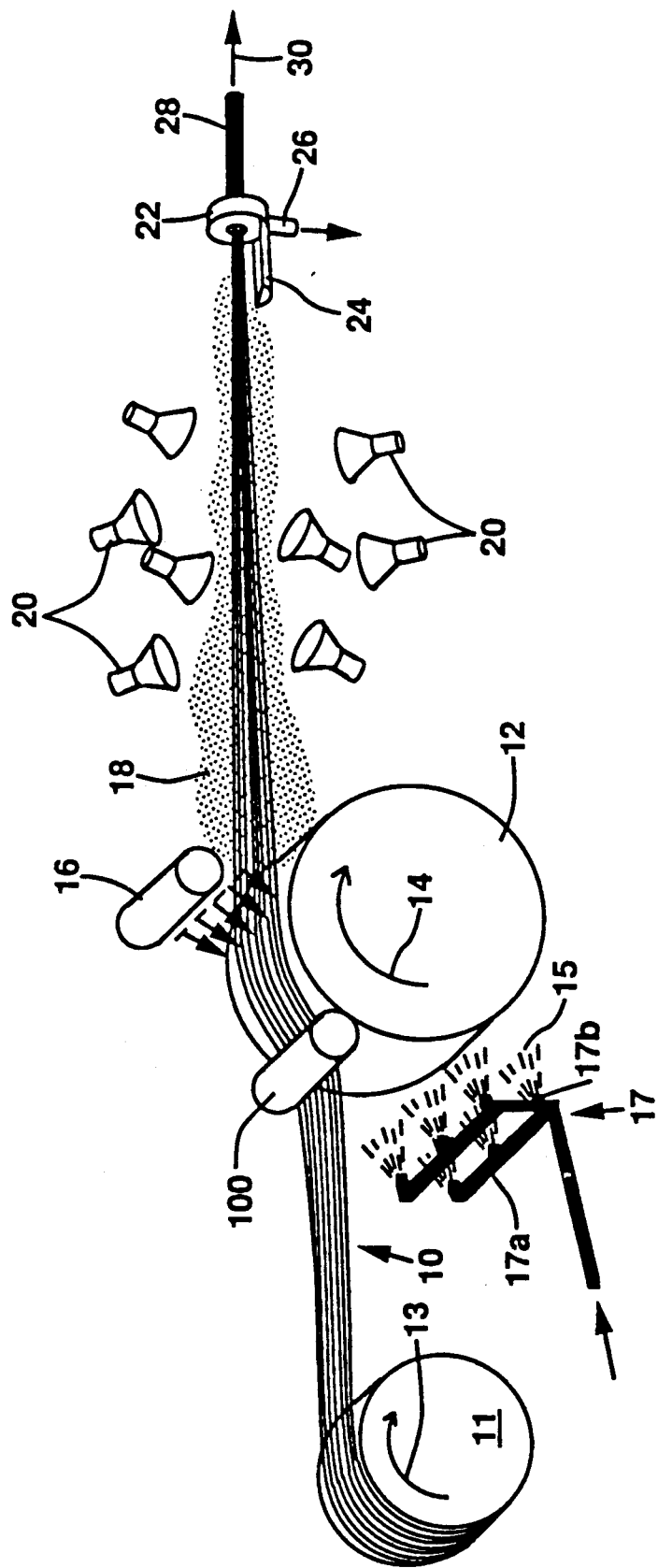
FIG. 1 is an isometric view of a first embodiment of the invention used to make a fiber bundle.

FIG. 1 shows a warp 10 of continuous separate glass ($SiO_2$) fibers that are dispensed from a drum 11 rotating in the direction indicated by arrow 13. Warp 10 passes under hold down roller 100 and then passes partially around a drum 12 that rotates in the direction indicated by arrow 14. Drum 12 is heated, preferably by hot oil (not shown) to achieve a uniform temperature distribution. Other heating means, e.g., electrical resistance wires, can be used. A mixture of a hot gas, e.g., air, $N_2$, dry steam, He, etc., and melted particles of a thermoplastic resin is applied to warp 10 by spraying with a colinear plurality of apparatus 16, such as shown in U.S. patent application Ser. No. 106,478, filed Oct. 9, 1987, now abandoned. The thermoplastic typically comprises polybutylene terephthalate sold under the trademark "Valox", polyetherimid sold under the trademark "Ultem", a blend of polycarbonate and polybutylene terephthalate sold under the trademark "Xenoy", the polycarbonate thermoplastic sold under the trademark "Lexan", the mixture of high impact polystrene and polyphenylene oxide sold under the trademark "Noryl", all by General Electric (GE) Co., Pittsfield Mass., etc. If desired, the mixture provided by apparatus 16 can also include glass fibers to thicken and reinforce wall 10. A typical weight ratio for the resulting warp structure on drum 12 is between about 70% thermoplastic and 30% glass to about 55% thermoplastic and 45% glass; however, for unidirection warps up to about 70% glass and 30% thermoplastic can be used due to the tight packing density thereby achieved. In general, the ratio is chosen so that when the final structure is heated above the melting point of the thermoplastic, it can be formed into the final desired shape without remaining porosity and without adding either more resin or fiber.

Drum 12 is periodically coated with a mold release agent 15, e.g., a silicone based mold release agent etc., dispensed from spray apparatus 17 comprising spraybars 17a having nozzles 17b so that a warp 18 comprising thermoplastic powder melted onto glass fibers easily comes off drum 12 to be heated by infra-red lamps 20. Other heating means, e.g., a low velocity hot gas, radio frequency fields, etc., can be used. Heating means 20 is used lo keep the thermoplastic and glass hot during the drawing step (described below). The temperature of the mixture from apparatus 16, the temperature of drum 12, and the temperature of warp 18 caused by lamps 20 should be slight greater than the melting point, but below the degradation point, of the thermoplastic. Typical temperatures usually are between about 400° to 800° F. depending upon the particular thermoplastic used. Thereafter warp or tow 18 is pultruded, i.e., is drawn through die 22 wherein excess, i.e., unisolidified, thermoplastic resin goes into a heated pan 24 having a spigot 26, both being disposed underneath die 22. A fully coated fiber bundle preform 28 emerges from die 22 due to a pulling force indicated by arrow 30. The pulling force can be supplied by a pair of driven counter-rotating calendar rolls (not shown) located some distance, e.g., 7 to 20 feet (2.1336 to 6.096 meters), from die 22 to allow the thermoplastic to ambient air cool below its glass transition temperature and set, or by a driven take-up spool (not shown) also located some distance from die 22 as is known in pultrusion state-of-the-art. Instead of air cooling, a fan or a tank of water (neither shown) can be used as a cooling means. Thereafter bundle 28 is unwound and molded into the final desired shape.

It will be appreciated that the above described apparatus and process applies a thermoplastic coating to continuous fibers to make a drapable tow that can be laid up to make a preform. The plastic coating is attached to the fibers and the fibers are easy to handle. Moreover, the plastic serves as a glue so that no loss of fibers or thermoplastic resin occurs in subsequent handling.

Sometimes it is desirable to make a multilayer (graded) composite sheet preform such as shown in U.S. Pat. No. 4,716,072. FIG. 2 shows a method and apparatus for making such a preform. A first glass veil 32 is dispensed from a roller 33 rotating in the direction indicated by arrow 34. A belt 36, such as steel for good thermal conductivity and strength, travels in the direction indicated by arrows 38 and 40 between rollers 42 and 44, which rotate in the directions respectively indicated by arrows 46 and 48. A counter-rotating roller 50 is disposed adjacent roller 42 and rotates in the direction indicated by arrow 52. A mold release agent 15 is periodically applied to belt 36 if necessary by spraying apparatus 17. Veil 32 passes between rollers 42 and 50 in order to be conveyed by the top surface of belt 36.

Disposed above belt 36 and veil 32 are a plurality of apparatus 16. Each of apparatus 16a, 16b, 16c, 16d and 16e is a colinear arrangement of means for applying a mixture of hot gas, glass fibers, and melted thermoplastic powder completely across the width of veil 32. A supply pipe 58 provides thermoplastic powder to all of the apparatus 16. Pipes 60, 62 and 64 convey a mixture of glass fibers respectively having lengths of 1 inch (2.54 cm), ½ inch (1.27 cm), and ¼ inch (0.635 cm) and hot gas. Other lengths can be used. Pipe 60 communicates with apparatus 16a and 16e, pipe 62 communicates with apparatus 16b and 16d, and pipe 64 communicates with apparatus 16c. As veil layer 32 passes under apparatus 16a, a layer 66 (FIG. 3) having thermoplastic coated 1 inch fibers is deposited thereupon to form a composite structure. As layers 32 and 66 pass under apparatus 16b, a layer 68 having thermoplastic coated ½ inch glass fibers is deposited. As layers 32, 66, and 68 pass under apparatus 16c, a layer 70 having thermoplastic coated ¼ inch glass fibers is deposited. Similarly, layers 72 and 74 of coated ½ and 1 inch fibers, respectively, are sequentially deposited as the composite structure passes apparatus 16d and 16e, respectively. Lengths described are examples only to describe how the process can work. Other lengths and types of distributions across the structure could be made. For example, the center of the structure could have long fibers while the outside edges had short fibers. It is noted that the resulting mat composite preform is symmetrical with respect to the mat thickness, but this is not necessary.

A second glass veil 76 is dispensed from roller 78 rotating in the direction indicated by arrow 80 to be applied to the composite structure by roller 82 counter rotating with respect to roller 44 as indicated by arrow 84. Rollers 44 and 82 are heated to a temperature above the melting point of the thermoplastic and, thus they drive the thermoplastic into veils 32 and 76, thereby coating the glass fibers therein. The resulting composite blanket is air cooled by fan 86 to below the glass transition temperature of the thermoplastic and then wound around take up roller 88 rotating in the direction indicated by arrow 90 for storage and transportation. Preform materials can then be cut from this blanket and molded into desired shapes.

It will be appreciated that in the second embodiment instead of using the glass veils 32 and 76, glass fibers can be chopped and sprayed using a gun as is presently done for layup of thermosetting materials.

What is claimed is:

1. A process for coating glass fibers with a thermoplastic, said process comprising:
   heating a thermoplastic powder until molten;
   spraying said heated thermoplastic powder to the fibers to coat the fibers; and
   cooling the coated fibers to below the glass transition temperature of the thermoplastic.

2. The process of claim 1 further comprising heating the coated fibers before said cooling step.

3. The process of claim 2 wherein said step of heating the coated fibers comprises heating with a temperature of between about 400° to 800° F.

4. The process of claim 2 further comprising drawing the heated powder and fibers.

5. The process of claim 4 further comprising removing excess thermoplastic.

6. The process of claim 1 wherein said heating step comprises heating a mixture of thermoplastic powder and glass fibers.

7. The process of claim 1 wherein said heating step comprises heating with a temperature of between about 400° to 800° F.

8. The process of claim 1 wherein said applying step comprises applying the heated thermoplastic powder to a first glass layer; and further comprising driving said powder into said layer.

9. The process of claim 8 further comprising sequentially forming layers from bottom to top of a mixture comprising heated thermoplastic powder and glass fibers of varying lengths on said first glass layer, and applying a second glass layer to the topmost of said mixture layers.

10. The process of claim 9 wherein each of said first and second glass layers comprises a veil.

11. The process of claim 9 wherein said driving step comprises driving said powder into said second glass layer.

12. The process of claim 9 wherein said sequential forming step comprises forming symmetrically disposed layers.

* * * * *